United States Patent Office 3,522,157
Patented July 28, 1970

3,522,157
PROCESS FOR THE MANUFACTURE OF
A-NOR-B-HOMO-STEROIDS
Oskar Jeger and Kurt Schaffner, Zurich, Switzerland, assignors to Ciba Corporation, New York, N.Y., a corporation of Delaware
No Drawing. Application July 14, 1964, Ser. No. 382,643, which is a continuation-in-part of application Ser. No. 266,524, Mar. 20, 1963. Divided and this application July 8, 1969, Ser. No. 840,053
Claims priority, application Switzerland, Mar. 23, 1962, 3,533/62
Int. Cl. B01j 1/10
U.S. Cl. 204—158                    3 Claims

ABSTRACT OF THE DISCLOSURE

A-nor-B-homo-steroids are prepared by irradiating 3-oxo-4,5-oxido-steroids with ultraviolet light.

CROSS-REFERENCES TO RELATED APPLICATIONS

This is a division of our application Ser. No. 382,643, filed July 14, 1964, which itself is a continuation-in-part of our application Ser. No. 266,524, filed Mar. 20, 1963 now abandoned.

BACKGROUND OF THE INVENTION

The present invention relates to a new process of manufacture of A-nor-B-homo-steroids, more particularly 3-oxo- and 3:6-dioxo-A-nor-B-homo-steroids, starting from 3-oxo-4:5-oxidosteroids. The new compounds of this class are biologically active or represent intermediates for the manufacture of biologically active compounds. Such are e.g. the 3:6-dioxo-A-nor-B-homo-androstanes and -$\Delta^1$-androstenes, which have in position 17$\beta$ a free or esterified hydroxyl group, and also the corresponding 3-mono-oxo-compounds; they display a high anabolic activity coupled with a very low androgenic activity. The 3:6 - dioxo - A-nor-B-homopregnane compounds, more especially those which contain in position 20, and possibly in position 11, an oxo group, in positions 17 and/or 21 and 11$\beta$ hydroxyl groups, are of very special importance as novel compounds having a progestative or anti-inflammatory action respectively. Other compounds, such as the A-nor-B-homo-steroids of the androstane and pregnane series, which have substituents which might be converted into those named above typical for the biologically active compounds, are important as intermediates for said active compounds. This also applies to the other steroid series such as the A-nor-B-homo-steroids of the cholane, cholestane, spirostane, cardanolide, and bufanolide series. They may be transformed in a manner known per se into the active compounds of the androstane and pregnane series, for example, by an acylolytic, oxidative or microbiological method.

The hitherto known steroids having the A-nor-B-homo skeleton—namely 6-oxo-A-nor-B-homocholestane and 6-oxo - 17$\beta$-hydroxy-5$\alpha$- and -5$\beta$-A-nor-B-homo-androstane and their 17-benzoates—were obtained by basic treatment of the corresponding 4$\alpha$-tosyloxy-5$\alpha$-hydroxy compounds.

SUMMARY OF THE INVENTION

It has been found that A-nor-B-homosteroids can be obtained in a novel and simpler manner by irradiating 3-oxo-4:5-oxidosteroids with ultra-violet light and, if desired, converting the resulting 3:6-dioxo-A-nor-B-homo-steroids into their functional derivatives and/or metal salts, or by hydrogenating resulting $\Delta^5$-3-oxo-6-acyloxy-A-nor-B-homosteroids.

The present process is illustrated, for example, by the following scheme of partial formulae:

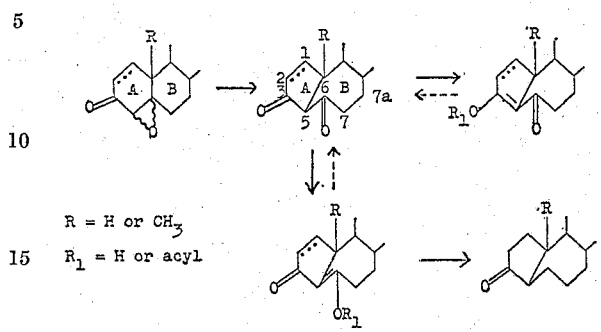

R = H or $CH_3$
$R_1$ = H or acyl

The 3-oxo-4$\alpha$:5$\alpha$- and 4$\beta$:5$\beta$-oxidosteroids, saturated in positions 1 and 2, used as starting materials can be prepared in the manner known per se from the corresponding $\Delta^4$-3-oxo compounds, for example by treatment with alkaline hydrogen peroxide or per-acids, or by hydrogenation of $\Delta^1$ - 3 - oxo - 4:5-oxidosteroids. The last-mentioned starting materials are new; surprisingly, they can be obtained directly from $\Delta^{1,4}$-3-oxosteroid-dienes by treatment with per-acids, for example with organic per-acids, such as lower aliphatic or aromatic per-acids, for example with peracetic, perbenzoic and monoperphthalic acid, or by dehydrogenation of the above-mentioned 1:2-saturated 3-oxo-4:5-oxidosteroids, for example with selenium dioxide or dicyano-dichloroquinone.

The irradiation according to the invention of 3-oxo-4:5-oxidosteroids is advantageously performed in an organic solvent, for example in an aliphatic or cyclo-aliphatic hydrocarbon such as pentane, hexane or methyl-cyclohexane. Particularly suitable are aliphatic and cyclic ethers such, for instance, as diethyl ether or dioxane.

Suitable light is artificial or strong natural light; it is advantageous to use ultra-violet light such as is emitted by mercury low-pressure or high-pressure burners, or strong sunlight. The irradiation is advantageously performed at a temperature ranging from 0° to +80° C.

In the 3:6-dioxo-A-nor-B-homosteroids obtained as reaction products, which, being $\beta$-diketo compounds are predominantly present in the enol form, any present ester or protective groups such, for example, as ketals or bis-methylenedioxy groups, may be split hydrolytically and free hydroxyl groups may be oxidized to oxo groups. On the other hand, the products of the present process may be converted in the known manner into their functional ketone derivatives derived from the enol form, or into metal salts. Thus, for example, acylation (for example treatment with a carboxylic anhydride, such as acetic or propionic anhydride) yields the corresponding enol esters; with etherifying agents such, for example, as alcohols or thio-alcohols in the presence of an acid catalyst, the enolethers and, respectively, thioenolethers are obtained. When the products of the present process are reacted, for example with hydrazines, cyclic hydrazones are obtained which may also be looked upon as pyrazole derivatives. Reaction with cupric salts furnishes the corresponding copper complexes.

The $\Delta^5$ - 3 - oxo-6-acyloxy-A-nor-B-homosteroids prepared by the present process can be converted into the corresponding saturated 6-unsubstituted 3-oxo-A-nor-B-homosteroids by catalytic hydrogenation in a manner known per se, such as hydrogenation, for example, in benzene or alcohol, with palladium carbon or palladium-barium carbonate catalyst.

The 3-oxo-4$\alpha$:5$\alpha$- and 4$\beta$:5$\beta$-oxidosteroids used as starting materials in the present process belong preferably to the androstane, pregnane, cholane, cholestane, spirostane or cardanolide series or to the corresponding 19-nor series and may contain, in addition to the aforementioned groupings, in one or more than one of the positions 1, 6, 7, 8, 9, 11, 12, 14, 15–21 further substituents such as alkyl (for example methyl) groups and/or halogen atoms, free or functionally converted oxo groups, or free, esterified or etherified hydroxyl groups. Furthermore, the starting materials may contain double bonds, more especially as mentioned above, between carbon atoms 1 and 2. It is also possible to use a mixture of the two 4:5-isomeric epoxides.

Particularly important starting materials are, for example, the following compounds:

3-oxo-4α:5α-oxido- and -4β:5β-oxido-17-hydroxyandrostane and its esters,

3:17-dioxo-4α:5α-oxido- and -4β:5β-oxidoandrostane and its 17-ethyleneketal, 3-oxo-4α:5α-oxido- and -4β:5β-oxido-17α-alkyl-, -17α-alkenyl- and -17α-alkinyl-17β-hydroxyandrostanes and their esters, such as, for example 3-oxo-4α:5α-oxido- and -4β:5β-oxido - 17β - hydroxy-17α-methyl-, -17α-ethyl-, -17α-vinyl-, -17α-ethinyl- and -17α-allyl-androstane, 3:20-dioxo-4α:5α-oxido- and 4β:5β-oxidopregnane, 3:20-dioxo-4α:5α-oxido- and 4β:5β-oxido-17α-hydroxypregnane and their esters, 3:20-dioxo-4α:5α-oxido- and -4β:5β-oxido-21-hydroxypregnane and their esters, 3:20-dioxo-4α:5α-oxido- and -4β:5β-oxido-17α:21-dihydroxypregnane, their esters and 17:20;20:21-bismethylenedioxy compounds, 3:20-dioxo-4α:5α-oxido- and -4β:5β-oxido-11β:17α:21-trihydroxypregnane, their esters and 17:20;20:21-bismethylenedioxy compounds, inter alia, for example, the lactone of Δ¹-3-oxo-4:5-oxido-17β-hydroxy-17α-(β-carboxyethyl)-androstene and the 1-dehydro-4:5-oxidotestololactone; furthermore the derivatives, unsaturated in positions 1 and 2, of the above compounds. The 17-oxo or 20-oxo compounds are advantageously used in the form of their 17-monoketals or 20-monoketals.

The 3:6-dioxo-A-nor-B-homosteroids, obtained by the present process, and their functional derivatives such, for example, as their enolesters (derived from the tautomeric enol form) of organic, more especially lower aliphatic or aromatic carboxylic or sulfonic acids, such, for example, as acetic, propionic, butyric, benzoic, para-toluenesulfonic acid, and enolethers and enolthioethers, for example lower alkyl ethers and thioethers (such as methyl-, ethyl- and propyl-ether and thioether), especially the compounds of the Formulae I and II

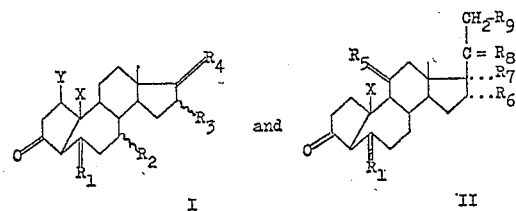

in which $R_1$ stands for a member selected from the group consisting of $=H_2$ and O, $R_2$ for a member selected from the group consisting of —H, —lower alkyl ··· lower alkyl, $R_3$ for a member selected from the group consisting of —H, —lower alkyl, ··· lower alkyl, —OR, ··· OR, $R_4$ for a member selected from the group consisting of =O,

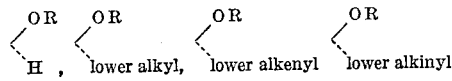

and

$R_5$ for a member selected from the group consisting of

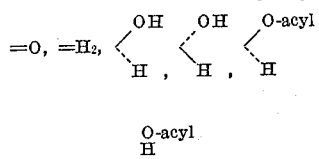

and

$R_6$ and $R_7$ for a member selected from the group consisting of ··H, ··lower alkyl and ··OR, $R_6$ together with $R_7$ a member selected from the group consisting of $$\overset{O}{\underset{O}{>}}CH—R \text{ and } \overset{O}{\underset{O}{>}}C\overset{R}{\underset{R_8}{<}}$$

for a member selected from the group consisting of

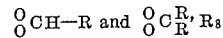

for a member selected from the group consisting of —H and —O—R and R is a member selected from the group consisting of —H, an acyl group, a hydrocarbon radical, X and Y each is a member selected from the group consisting of hydrogen and methyl, and the 1-dehydro derivatives, tautomeric forms and the enol esters and ethers thereof, are pharmacologically valuable compounds or intermediates for the preparing of pharmacologically valuable compounds.

Thus the compounds of Formula I in which $R_4$ stands for a free or esterified or etherified hydroxyl group together with a hydrogen atom or a lower alkyl group exhibit a high anabolic action. When there is a lower alkyl group in 17α-position together with the 17β-hydroxyl group, the anabolic action develops also upon peroral administration. These compounds are therefore suitable for use as medicaments for the treatment of all conditions requiring an increased protein synthesis, such as chronic loss in weight, post-operative and post-infection conditions, anorexia and osteoporosis, more especially in geriatry. Particularly suitable are the following compounds:

3:6-dioxo-17β-hydroxy-A-nor-B-homo-androstane and its esters,

3:6-dioxo-17β-hydroxy-17α-alkyl-A-nor-B-homo-androstanes and their esters,

3:6-dioxo-17β-hydroxy-17α-alkyl-A-nor-B-homo-oestranes and their esters, and 7aα-lower alkyl derivatives of these compounds and the 1-dehydro-derivatives of all these compounds. As specific compounds there may be mentioned for instance:

the 3:6-dioxo-17β-hydroxy-A-nor-B-homo-androstane
the 3:6-dioxo-17β-acetoxy-A-nor-B-homo-androstane
the 3:6-dioxo-17β-isobutyryloxy-A-nor-B-homo-androstane
the 3:6-dioxo-17β-valerianyloxy-A-nor-B-homo-androstane
the 3:6-dioxo-17β-undecenyloxy-A-nor-B-homo-androstane
the 3:6-dioxo-17β-decanoyloxy-A-nor-B-homo-androstane
the 3:6-dioxo-17β-(phenylpropionyloxy)A-nor-B-homo-androstane
the Δ¹-3:6-dioxo-17β-acetoxy-1-methyl-A-nor-B-homo-androstene
the Δ¹-3:6-dioxo-17β-acetoxy-A-nor-B-homo-oestrene
the 3:6-dioxo-17β-hydroxy-7aα, 17α-dimethyl-A-nor-B-homo-androstane.

Outstanding anabolic properties have the compounds:

3:6-dioxo-17β-hydroxy-17α-methyl-A-nor-B-homo-androstane
3:6-dioxo-17β-hydroxy-17α-methyl-A-nor-B-homo-oestrane and the 3:6-dioxo-17β-hydroxy-7aα, 17α-dimethyl-A-nor-B-homo-oestrane and their 1-dehydro-derivatives.

The anabolic effects may be measured pharmacologically in fully grown, male castrated rats by the so-called "levator-ani test," by giving the animals increasing doses of the substance to be tested and measuring the increasing weight of the involuted levator ani muscle. An optimal effect may be considered that which represents a full restitution of the muscle to the weight of that muscle in normal control animals. Such complete restitution is attained with very small doses of the substances of the present invention. For instance, when 3:6-dioxo-17β-hydroxy-17α-methyl-A-nor-B-homo-androstane is administered subcutaneously, the optimal anabolic effect corresponding to said complete restitution is attained with a dose of approximately 0,3 mg./kg. daily, for 15 days. The androgenic effect of the substance may similarly be measured by determining the increase in weight of the involuted seminal vesicles of the castrated animals. To compare the androgenic activity of the same susbtance with its anabolic effect the optimal androgenic dose, viz. that provoking a complete weight restitution of the seminal vesicles, as compared to the controls, is evaluated. In the above case of the 3:6-dioxo-17β-hydroxy-17α-methyl-A-nor-B-homo-androstane this androgenic dose is 13 to 20 times higher than the optimal anabolic dose when the administration is effected by the subcutaneous route. This means that a very good dissociation between anabolic and androgenic effect is present which is a prerequisite for an ideal anabolic treatment. In the other compound mentioned above, the 3:6-dioxo-17β-hydroxy-7aα- 17α-dimethyl-A-nor-B-homo-oestrane, these conditions are still more favorable, the ratio between the dose eliciting the optimal androgenic effect and the dose eliciting the optimal anabolic effect being about 100, when the substance is administered subcutaneously and about 30–70 on peroral administration. The absolute value of the anabolic effect is extremely high with this compound, the optimal dose under the aforementioned experimental conditions being 0.03 mg./kg. body weight daily for 15 days when given subcutaneously and 1.0 mg./kg. daily for 15 days when given orally.

Compounds of the above Formula I wherein $R_4$ stands for a free or esterified or etherified hydroxyl group together with an unsaturated hydrocarbon radical, especially a vinyl, allyl, ethinyl or propinyl group, which may also be halogenated, e.g. fluorinated, show a gestagenic or ovulation inhibiting action. Especially active are the oestrane compounds and their 1-dehydro derivatives, for example $\Delta^1$-3:6-dioxo-17β-hydroxy-17α-vinyl- and -17α-ethinyl-A-nor-B-homo-androstene and their esters and $\Delta^1$-3:6-dioxo-17β-hydroxy-17α-vinyl- and -17α-ethinyl-A-nor-B-homo-oestrene and their esters.

Compounds of Formula II above in which $R_8$ stands for an oxo group and $R_9$ for a hydrogen atom, exhibit a pronounced progestative action. Special mention deserve 3:6:20-trioxo-A-nor-B-homo-pregnane,
3:6:20-trioxo-17α-hydroxy-A-nor-B-homo-pregnane and its esters,
$\Delta^1$-3:6:20-trioxo-A-nor-B-homo-pregnene,
$\Delta^1$-3:6:20-trioxo-17β-hydroxy-A-nor-B-homo-pregnene and its esters,
3:6:20-trioxo 16, 17 dihydroxy-A-nor-B-homo-pregnane, and their 6-enol-esters and/or 17-esters or ethers, for example the 6- or 17α-acetates or 16α, 17α-acetonides of the 16α, 17α-dihydroxy derivatives.

Compounds of the above Formula II wherein $R_9$ is a free, an esterified or etherified hydroxyl and $R_8$ is an oxo group are distinguished by their anti-inflammatory and glucocorticoid action and may thus be used in the treatment of inflammatory diseases of the joints and their surroundings, for example polyarthritis, in acute and chronic rheumatic fever and in the form of creams and salves in dermatology for the treatment of eczema of diverse origin. Especially active are in this respect compounds of the formula

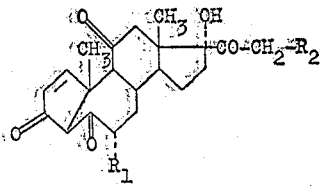

wherein $R_1$ represents a hydrogen atom or a methyl group and $R_2$ is a free or esterified hydroxyl group as well as 6-enol-esters or 6-enol-ethers thereof. As specific compounds there may be mentioned particularly the $\Delta^1$-3:6:11:20 - tetraoxo - 17α:21 dihydroxy - A - nor - B - homo-pregnene, its lower aliphatic carboxylic acid esters, such as the acetate, the trimethylacetate, the propionate, valerate caproate etc., and the 7-methyl-derivatives of these compounds.

All compounds of Formulae I and II above may also be employed in veterinary medicine e.g. as additives to animal fodder.

The acid radicals in the above-mentioned esters are more especially those of aliphatic, cycloaliphatic, araliphatic, aromatic or heterocyclic carboxylic acids containing 1 to 15 carbon atoms, for example formiates, acetates, propionates, butyrates, trimethylacetates, caproates, valerates, oenanthates, decanoates, undecylenates, cyclopentylpropionates, hexahydrobenzoates, phenylpropionates, benzoates, furoates, trifluoracetates, ethyl or methyl carbonates, or the like.

Ethers are primarily derived from aliphatic, araliphatic, cycloaliphatic or heterocyclic alcohols preferably having from 1 to 8 carbon atoms, for example from methanol, ethanol, propanol, benzyl alcohol, cyclopentanol or tetrahydropyranol.

In the case of 3,6-dioxo-17β-hydroxy-A-nor-B-homo-androstane or -oestrane compounds or their 1-dehydro-derivatives, 6-mono-esters and 6-mono-ethers, as derived from the enol form of the steroids said, as well as 17-mono-esters or ethers or 6,17-diesters or diethers may be prepared from the unesterified compounds. Thus, for example, by acylation of a 3,6-dioxo-17α-alkyl-17β-hydroxy-androstane or oestrane compound, for example, by treatment with carboxylic acid anhydride such as acetic or propionic anhydride at room temperature, the 6-enol-esters are obtained, whereas treatment with an etherifying agent, for example an alcohol, such as an alkanol, in the presence of an acidic catalyst gives rise to the corresponding enolethers. To obtain 6,17-diesters the acylation is preferably performed at elevated temperature. In the 6,17-diesters thus obtained it is possible to liberate the 6-enol ester group by acid hydrolysis, thus rendering accessible the 17-monoesters. When there is no hydrocarbon in 17α-position, the acylation affords preferably the 6,17α-diesters, from which there are obtained 6-mono-esters by mild alkaline hydrolysis and 17-mono-esters by acidic hydrolysis.

From 21 - hydroxy-20-keto-A-nor-B-homo-pregnane derivatives or their 1 - dehydro-derivatives, such as for instance the above named $\Delta^1$-3,6,11,20-tetraoxo-17α,21-dihydroxy A-nor-B-homo-pregnene, there are obtained, under mild condition, 21-esters and, then, after longer periods of acylation, the 6,21-diesters. In the latter it is possible to saponify only the 6-ester group by acid hydrolysis, or only the 21-ester group by mild alkaline hydrolysis. There can thus be prepared 6- and 21-monoesters as well as 6,21-diesters.

The new pharmacologically active compounds can be used for the manufacture of pharmaceutical preparations. These contain said active compounds together with a solid or liquid medicinal excipient. More particularly the preparations of the present invention are characterized by the content of one of the new A-nor-B-homo-steroids. The preparations are made by as such known methods, for example, with the use of pharmaceutical organic or inorganic excipients, suitable for parenteral, enteral and particularly oral, or also topic administration. Suitable excipients are substances that do not react with the new compounds such, as for example, water, vegetable oils, benzyl alcohols, polyethylene glycols, gelatine, lactose, starch, magnesium stearate, talc, white petroleum jelly, cholesterol or other medicinal excipients. More especially, preparations are made which are suitable for parenteral administration, preferably solutions, above all oily or aqueous solutions: furthermore suspensions, emulsions or implants; for enteral administration there are also made tablets or dragees, and for local administration also ointments or creams. If desired the preparations may be sterilized or they may contain assistants such as preserving, stabilizing, wetting or emulsifying agents, salts for regulating the osmotic pressure or buffers. They may also contain other therapeutically active compounds. They are prepared in the known manner. The content of the active substance in these preparations, such as of a tablet, is preferably 0.01–20 mg. or 0.03–50%, especially 0.1 to 10% by weight. Said pharmaceutical preparations can be used in human or veterinary medicine.

The process is described more fully in the following examples. The ultra-violet absorption spectra have been established in ethanolic solutions and the specific rotations were measured in a chloroform solution in a tube of 10 cm. length.

The irradiation with ultra-violet rays is performed under nitrogen in a quartz vessel in which the source of light is centrally disposed and which is cooled by means of water. The light sources used are low-pressure burners NK 6/20 (monochromatic light of wavelength 254 m$\mu$) and high-pressure burners Q 81 (both manufactured by Quartzlampen GmbH, Hanau).

Unless otherwise indicated, working up of the reaction mixture is performed as follows: It is taken up in ether, the organic phase washed with water until neutral, and the ethereal solution is dried over anhydrous sodium sulfate and evaporated in a rotary evaporator. Chromatography is performed, unless otherwise stated, with the use of 30 times the weight of neutral alumina of activity II.

EXAMPLE 1

A mixture of 15 grams of 1-dehydrotestosterone acetate and a solution of perbenzoic acid in 130 ml. of chloroform (8.5 mg. per ml.) is kept for 4 days in the dark at room temperature. The reaction solution is then diluted with ether and agitated successively with aqueous solutions of potassium iodide and sodium thiosulfate. A partially crystalline crude product is obtained which is chromatographed on alumina. A 2:1-mixture of benzene and hexane elutes 3.6 grams of a crystalline fraction, while a 1:1-mixture of benzene and ether elutes 7.5 grams of unchanged starting material.

The first fraction is recrystallized four times from acetone+hexane and furnishes 2.15 grams of $\Delta^1$-3-oxo-4$\beta$:5$\beta$ - oxido - 17$\beta$ - acetoxyandrostene. Constant melting point: 144–145° C. Optical rotation [$\alpha$]$_D$=+250° (c.=1.02). Ultra-violet spectrum: $\lambda_{max}$=232 m$\mu$ (log $\epsilon$=3.96). Infra-red spectrum (in chloroform): $\nu$=1725, 1680, 1623, 1255 cm.$^{-1}$.

After 2 recrystallizations from acetone+hexane and 8 from ethanol the mother liquor products furnish 130 mg. of $\Delta^1$-3-oxo-4$\alpha$:5$\alpha$-oxido-17$\beta$-acetoxyandrostene having a constant melting point of 139–141° C. Ultra-violet spectrum: $\lambda_{max}$=227.5 m$\mu$ (log $\epsilon$=4.02). Infra-red spectrum (in chloroform): $\nu$=1722, 1677, 1612, 1256 cm.$^{-1}$.

EXAMPLE 2

200 mg. of $\Delta^1$-3-oxo-4$\beta$:5$\beta$ - oxido-17$\beta$ - acetoxyandrostene are hydrogenated in the presence of 200 mg. of palladium black of 5% strength in 10 ml. of benzene. When the absorption of hydrogen (1 mol) ceases, the solution is filtered through Celit, evaporated under vacuum, and the residue is recrystallized from acetone+hexane. Melting point: 153–155° C. Ultra-violet spectrum: final absorption at 210 m$\mu$ (log $\epsilon$=3.36). Infra-red spectrum (in chloroform): $\nu$=1725, 1260 cm.$^{-1}$. Optical rotation [$\alpha$]$_D$=+131° (c.=1.85). As revealed by the mixed melting point and the infra-red spectrum the product is identical with authentic 3-oxo-4$\beta$:5$\beta$-oxido-17$\beta$-acetoxyandrostane; melting point 153–155° C.; optical rotation [$\alpha$]$_D$=+135° (c.=1.30).

EXAMPLE 3

30 mg. of $\Delta^1$-3-oxo-4$\alpha$:5$\alpha$-oxido-17$\beta$-acetoxyandrostene are hydrogenated with 30 mg. of palladium black of 5% strength in 3.5 ml. of benzene as described in Example 2 for $\Delta^{-1}$-3-oxo-4$\beta$:5$\beta$-oxido-17$\beta$-acetoxyandrostene. After crystallization from acetone+hexane the resulting product has a constant melting point at 164–165° C. Optical rotation [$\alpha$]$_D$=68° (c.=0.64). Ultra-violet spectrum: final absorption at 210 m$\mu$ (log $\epsilon$=3.49). Infra-red spectrum (in chloroform): $\nu$=1715, 1268 cm.$^{-1}$.

EXAMPLE 4

A solution of 2.0 grams of $\Delta^1$-3-oxo-4$\beta$:5$\beta$-oxido-17$\beta$-acetoxyandrostene in 200 ml. of dioxane is irradiated for 40 hours with a low-pressure burner, and then evaporated under vacuum. In the thin-layer chromatogram [eluant: benzene+methanol 19:1] of the crystalline residue no starting material can be detected. After three recrystallizations from methylene chloride+methanol there are obtained 1.60 grams of $\Delta^1$-3:6-dioxo-17$\beta$-acetoxy-A-nor-B-homoandrostene (constant melting point +171–172° C.). Ferric chloride test: positive. Optical rotation [$\alpha$]$_D$=+98° (c.=0.65). Ultra-violet spectrum: $\lambda_{max}$239 m$\mu$(log $\epsilon$=3.96), 3.11 m$\mu$ (log $\epsilon$=3.87). Infra-red spectrum: in chloroform: $\nu$=1730, 1670, 1618, 1260 cm.$^{-1}$; in nujol: $\nu$=1730, 1658, 1609, 1567 (weak), 1256 cm.$^{-1}$.

EXAMPLE 5

A solution of 380 mg. of $\Delta^1$-3-oxo-4$\alpha$:5$\alpha$-oxido-17$\beta$-acetoxyandrostene in 100 ml. of dioxane is irradiated for 2 hours with a low-pressure burner and then evaporated under vacuum. In the thin-layer chromatogram [eluant: benzene+methanol 19:1] of the residue no starting material can be detected. By chromatography on silica gel with a 19:1-mixture of benzene and ether there are obtained 200 mg. of crystals which, after three recrystallizations from methylene chloride+methanol, melt at 164–166° C. (130 mg.). Sublimation in a high vacuum at 150° C. yields pure $\Delta^1$-3:6-dioxo-17$\beta$-acetoxy-A-nor-B-homoandrostene melting at 171–172° C. which, according to its mixed melting point, specific rotation [$\alpha$]$_D$=+93° (c. =0.74) and infra-red spectrum, is identical with the photo product described above in Example 4.

EXAMPLE 6

450 mg. of $\Delta^1$-3:6-dioxo-17$\beta$-acetoxy-A-nor-B-homoandrostene are hydrogenated in the presence of 450 mg. of palladium black of 5% strength in 50 ml. of benzene. When the absorption of hydrogen has ceased (1 mol. after 30 minutes) the solution is filtered through Celit and the filtrate is evaporated under vacuum. The residue is chromatographed on silica gel. A 9:1-mixture of benzene and ether elutes 360 mg. of crystals which, after three recrystallizations from methylene chloride+methanol, yield 310 mg. of 3:6-dioxo-17$\beta$-acetoxy-A-nor-B-homoandrostane having a constant melting point of 154–156° C. Ferric chloride test: positive. Optical rotation [$\alpha$]$_D$=+47° (c.=0.72). Ultra-violet spectrum: $\lambda_{max}$=

291 mμ (log ε=3.96). Infra-red spectrum in chloroform: ν=1721, 1641, 1608, 1255 cm.$^{-1}$.

EXAMPLE 7

1.20 grams of 3-oxo-4β:5β-oxido-17β-acetoxy-androstene in 120 ml. of dioxane are irradiated for 54 hours with a low-pressure burner, and the solution is then evaporated under vacuum. According to its thin-layer chromatogram [eluant: 19:1-mixture of benzene and methanol] the residue contains starting material and about 25% of 3:6 - dioxo-17β-acetoxy-A-nor-B-homoandrostene. Ferric chloride test: positive. Ultra-violet spectrum: λ$_{max}$=293 mμ (log ε=3.32). The two compounds are very difficult to separate by chromatography on silica gel. Benzene elutes only 35 mg. of uniform crystals which, after recrystallization from methylene chloride+methanol, melt at 154–156° C. According to their mixed melting point, infra-red spectrum, ultra-violet spectrum (λ$_{max}$=291 mμ; (log ε=4.01) and specific rotation ([α]$_D$=+44°; c.=0.64) they are identified with the photo product described in Example 6.

EXAMPLE 8

450 mg. of 3-oxo-4β:5β-oxido-17β-acetoxyandrostane in 100 ml. of dioxane are irradiated for 2 hours with a high-pressure burner, and the solution is then evaporated under vacuum. The residue contains according to its thin-layer chromatogram [eluant: benzene+methanol 19:1], ultra-violet spectrum (λ$_{max}$=291 mμ; log ε=361) and ferric chloride test (positive), about 45% of 3:6-dioxo-17β-acetoxy-A-nor-B-homoandrostane and is free from starting material. Chromatography on silica gel with benzene+ether (9:1) furnishes 200 mg. of crystals which, after three recrystallizations from methylene chloride+methanol, melt at 154–156° C. (100 mg.) and according to their mixed melting point and infra-red spectrum are identical with the compound described in Example 6.

EXAMPLE 9

80 mg. of 3-oxo-4α:5α-oxido-17β-acetoxyandrostane in dioxane are irradiated in an open quartz reaction vessel for 10 hours with a low-pressure burner, and the solution is then evaporated under vacuum. According to the ferric chloride test (positive), thin-layer chromatogram [eluant: benzene+methanol 19:1] and ultra-violet spectrum (λ$_{max}$=293 mμ, log ε=3.41) the residue contains, inter alia, starting material as well as about 28% of the photo product described in Example 6. The mixture is difficult to separate; it is chromatographed on silica gel, with benzene eluting about 4 mg. of uniform crystals melting at 154–156° C. According to its mixed melting point, infrared spectrum and ultra-violet spectrum (λ$_{max}$=291 mμ, log ε=3.97), the compound is identical with 3:6-dioxo-17β-acetoxy-A-nor-B-homoandrostane.

EXAMPLE 10

440 mg. of Δ$^1$-3:6-dioxo-17β-acetoxy-A-nor-B-homoandrostene are kept for 6 days at room temperature in 10 ml. of a 1:1-mixture of acetic anhydride and pyridine. The solution is then evaporated to dryness under vacuum and the crystalline residue is dissolved in 9:1 benzene+ether and filtered through silica gel, to yield 350 mg. of Δ$^{1,5}$-3-oxo-6:17β-diacetoxy-A-nor-B-homoandrostadiene which, after three recrystallizations from acetone+hexane, melts at 120–121° C. Ferric chloride test negative. Optical rotation [α]$_D$=+103° (c.=0.91). Ultra-violet spectrum: λ$_{max}$=248 mμ (log ε=3.94). Infra-red spectrum in chloroform: 1755, 1722, 1703, 1649, 1595, 1255, 1165 cm.$^{-1}$.

EXAMPLE 11

200 mg. of Δ$^1$-3:6-dioxo-17β-acetoxy-A-nor-B-homoandrostene are hydrolyzed for 24 hours at room temperature in 5 ml. of saturated methanolic potassium carbonate solution. Extraction with ether furnishes 150 mg. of Δ$^1$-3:6-dioxo-17β-hydroxy-A-nor-B-homoandrostene which, after three recrystallizations from methanol, displays a constant melting point at 156–159° C. Infra-red spectrum (in Nujol): ν=3560, 1671, 1614 cm.$^{-1}$. Optical rotation [α]$_D$=+107° (c.=1.0). Ultra-violet spectrum:

λ$_{max}$=240 mμ, 311 mμ

(log ε=3.91, 3.82).

EXAMPLE 12

A solution of 80 mg. of Δ$^1$-3:6-dioxo-17β-acetoxy-A-nor-B-homoandrostene in 20 ml. of ethanol is mixed with a solution of 0.5 gram of copper acetate and 2 grams of sodium acetate in 20 ml. of water, whereupon the reaction solution turns instantaneously green. After 15 minutes it is poured into water and extracted with benzene. Evaporation of the organic phase under vacuum yields 94 mg. of green crystals which, according to their thin-layer chromatogram [eluant: benzene:methanol 19:1], are uniform. After three recrystallizations from methylene chloride+methanol there are obtained 40 mg. of the copper complex of Δ$^1$-3:6-dioxo-17β-acetoxy - A - nor-B-homoandrostene which decomposes at 300–310° C. Ultra-violet spectrum λ$_{max}$=332 mμ (log ε=4.14), 246 mμ (log ε=4.31). Infra-red spectrum in chloroform: ν=1721, 1595, 1565, 1498, 1260 cm.$^{-1}$.

EXAMPLE 13

580 mg. of 3:6-dioxo-17β-acetoxy-A-nor-B-homoandrostane are acetylated for 3 days at room temperature in a 1:1-mixture of acetic anhydride and pyridine. The reaction solution is evaporated under vacuum and the crystalline residue is dissolved in a 9:1-mixture of benzene+ether and filtered through silica gel, to yield Δ$^5$-3-oxo-6:17-diacetoxy-A-nor-B-homoandrostene which, after 3 recrystallizations from acetone+hexane, displays a constant melting point at 147–149° C. (425 mg.). Ultra-violet spectrum: λ$_{max}$=254 mμ (log ε=3.87). Infra-red spectrum in chloroform: ν=1745, 1720 (strong), 1638, 1255, 1160 cm.$^{-1}$. Optical rotation [α]$_D$=−10° (c.=1.0).

EXAMPLE 14

A solution of 80 mg. of 3:6-dioxo-17β-acetoxy-A-nor-B-homoandrostane in 20 ml. of ethanol is mixed with a solution of 0.5 gram of copper acetate and 2 grams of sodium acetate in 20 ml. of water. The solution immediately turns green and after 15 minutes it is poured into water, and with benzene 90 mg. of green crystals are isolated which, according to their thin-layer chromatogram [eluant benzene+methanol 19:1], are uniform. After having been recrystallized five times from methylene chloride+methanol the resulting copper complex of 3:6-dioxo-17β-acetoxy-A-nor-B-homoandrostane decomposes at 300–310° C. Ultra-violet spectrum: λ$_{max}$=310 mμ (log ε=4.33), 259 mμ (log ε=3.95). Infra-red spectrum in chloroform: ν=1720, 1578, 1475, 1260 cm.$^{-1}$.

EXAMPLE 15

A mixture of 300 mg. of 3:6-dioxo-17β-hydroxy-A-nor-B-homoandrostane, 2 ml. of hydrazine hydrate and 10 ml. of ethanol is heated in a bomb tube for 16 hours at 210° C. The cooled solution is then evaporated to dryness under vacuum and the resulting crystals (300 mg.)— which according to their thin-layer chromatogram [eluant: benzene+methanol 10:1] are uniform—are recrystallized twice from methanol, to yield the pyrazole derivative of 3:6-dioxo-17β-hydroxy-A-nor-B - homoandrostane which has a constant melting point at 152–155° C. Optical rotation [α]$_D$=+57° (c.=0.52). Infrared spectrum in chloroform: ν=3630, 3640, 1635 cm.$^{-1}$ (weak). Ultra-violet spectrum: λ$_{max}$=227 mμ (log ε=3.74).

EXAMPLE 16

3 grams of 3-oxo-4β:5β-oxido-17β-acetoxyandrostane and 900 mg. of selenium dioxide are mixed with 150 ml. of tertiary butanol and 1.5 ml. of glacial acetic acid. The suspension is refluxed for 24 hours under nitrogen, then another 900 mg. of selenium dioxide are added and the whole is boiled for 24 hours longer. The cooled solution is freed by decantation from the precipitated selenium, evaporated and the residue is dissolved in ethyl acetate. The organic solution is washed successively with dilute potassium bicarbonate solution, water, a freshly prepared ice-cold ammonium sulfide solution, ice-cold dilute ammonia solution, and water. After several recrystallizations from acetone+hexane there are obtained 2 grams of $\Delta^1$-3-oxo-4β:5β-oxido-17β - acetoxyandrostene melting at 144–145° C.

In an analogous manner 4β:5β-epoxy-19 nortestosterone acetate yields 1-dehydro-4β:5β-epoxy-19-nortestosterone acetate.

EXAMPLE 17

9 grams of $\Delta^{1,4}$-3-oxo-17α-methyl-17β-hydroxyandrostadiene in a solution of perbenzoic acid in 140 ml. of chloroform (35 mg. per ml.) are kept for 4 days in the dark at room temperature. The reaction solution is then diluted with ether and agitated with aqueous potassium iodide solution and then with aqueous sodium thiosulfate solution, to yield 9.1 grams of a crude product which is chromatographed on neutral alumina (activity III; 30 times the amount).

Benzene and a 9:1-mixture of benzene+ether elute 1830 mg. of amorphous material which is once more chromatographed on neutral alumina (activity III; 60 times the amount). A 9:1-mixture of benzene and ether elutes 1015 mg. of crystalline material which, after two recrystallizations from acetone+petroleum ether, melts at 165–167° C. (800 mg.). Optical rotation $[\alpha]_D = 105.1°$ (c.=0.56). Ultraviolet spectrum: $\lambda_{max}$=232 mµ (ε=9000). Infrared spectrum: $\nu$=3600, 1674, 1617 cm.$^{-1}$.

The product is a mixture of 85% of 3-oxo-4β:5β-oxido-17β-hydroxy-17α-methyl-$\Delta^1$-androstene and 15% of 3-oxo-4α:5α-oxido - 17β - hydroxy - 17α - methyl-$\Delta^1$-androstene. The ether fractions from the two chromatograms, after one crystallization from acetone+petroleum ether, yield 5.3 grams of unchanged starting material.

700 mg. of the above mixture are irradiated in 200 ml. of dioxane for 46 hours. The solution is then evaporated under vacuum. After having twice reprecipitated the crystalline crude product there are obtained 458 mg. of $\Delta^1$-3:6-dioxo-17α-methyl-17β-hydroxy-A-nor-B-homoandrostene melting at 126–128° C. Optical rotation $[\alpha]_D=+79.8°$ (c.=0.49). Ultra-violet spectrum: $\lambda_{max}$=239 mµ (ε=8200) and 311 mµ (ε=6700). Infrared spectrum: $\nu$=3610, 1761, 1708 cm.$^{-1}$.

EXAMPLE 18

Under the conditions described in Example 4 the bis-methylenedioxy compound of prednisolone yields via the corresponding 4α:5α-oxido or 4β:5β-oxido compound (prepared as described in Example 1) the 17:20; 20:21-bis - methylenedioxy compound of $\Delta^1$-3:6:20 - trioxo-11β:17α:21-trihydroxy-A-nor-B-homopregnene which, on hydrolysis, furnishes free $\Delta^1$-3:6:20-trioxo-11β:17α:21-trihydroxy-A-nor-B-homopregnene.

An analogous irradiation treatment of the $\Delta^1$-3-oxo-4α:5α- and -4β:5β-oxido-17β-acetoxy-19-norandrostene described in Example 16 yields $\Delta^1$-3:6-dioxo-17β-acetoxy-A-nor-B-homo-19-norandrostene.

EXAMPLE 19

A solution of 200 mg. of 3:6-dioxo-17β-acetoxy-A-nor-B-homoandrostane in 10 ml. of glacial acetic acid saturated with hydrochloric acid is mixed with 2 ml. of methylmercaptan. After 48 hours the reaction mixture is worked up, to give a substantially quantitative yield of $\Delta^{3(5)}$-methylmercapto-6-oxo-17β-acetoxy - A-nor-B-homoandrostene melting at 166–167° C. Optical rotation $[\alpha]_D=+124°$ (c.=0.67). Ultraviolet spectrum: $\lambda_{max}$=319 mµ (log ε=4.02). Infrared spectrum in chloroform: $\nu$=1720, 1624, 1255 cm.$^{-1}$. On reductive desulfurization with Raney nickel the compound furnishes 6-oxo-17α-acetoxy-A-nor-B-homoandrostane melting at 114–115° C. Optical rotation $[\alpha]_D=+115°$ (c.=0.67). Infrared spectrum in chloroform: =1723, 1692, 1255 cm.$^{-1}$. By subsequent hydrolysis this product is converted into the known 6-oxo-17α-hydroxy-A-nor-B-homoandrostane melting at 160–161° C.; optical rotation $[\alpha]_D=+141°$ (c.=0.61).

EXAMPLE 20

250 mg. of $\Delta^{1,5}$-3-oxo-6:17-diacetoxy-A-nor-B-homoandrostadiene are hydrogenated in 20 ml. of benzene with 250 mg. of palladium black of 5% strength. The absorption of hydrogen is 25 ml. in 20 minutes. After the solution has been freed from the catalyst, it is evaporated under vacuum and the residue is chromatographed on 7 grams of acid alumina (activity II). 85 mg. of crystals are isolated with a 1:1-mixture of hexane and benzene, which, after two recrystallizations from ether:pentane and sublimation under high vacuum, melt at 139–140° C. Optical rotation $[\alpha]_D=-112°$ (c.=0.49). The compound is pure 3-oxo-17β-acetoxy-A-nor-B-homoandrostane.

EXAMPLE 21

150 mg. of $\Delta^5$-3-oxo-6:17β - diacetoxy - A - nor-B-homoandrostene are hydrogenated in 5 ml. of benzene in the presence of 150 mg. of palladium black of 5% strength. A mixture is obtained which is chromatographed on 5 grams of acid alumina (activity II). A 1:1-mixture of hexane and benzene yields 50 mg. of 3-oxo-17β-acetoxy-A-nor-B-homoandrostane which is recrystallized twice from ether+pentane and sublimed in a high vacuum. The melting point is 139–140° C. Optical rotation $[\alpha]_D=-116°$ (c.=0.43). Infra-red spectrum in chloroform: $\lambda_{max}$=1727, 1258 cm.$^{-1}$. The compound is identical with the compound described in Example 20.

EXAMPLE 22

10 mg. of 3-oxo - 17β-acetoxy-A-nor-B-homoandrostane are kept for 48 hours at room temperature in a saturated methanolic potassium hydroxide solution. After working up, 8 mg. of 3-oxo-17β - hydroxy - A - nor-B-homoandrostane are obtained which, after four recrystallizations from acetone+hexane, melts at 129–130° C. Infra-red spectrum in chloroform: $\lambda_{max}$=3620, 1725 cm.$^{-1}$.

EXAMPLE 23

1.5 g. of $\Delta^1$-3:20-dioxo - 4:5 - oxido - 17α-acetoxypregnene in 500 ml. of dioxane are irradiated for 72 hours at 26 to 29° C. with a low-pressure burner, and the solution is then evaporated under vacuum. The residue is dissolved in 50 ml. of alcohol, diluted with 150 ml. of ether and agitated in a separating funnel with 10 ml. of ice-cold sodium hydroxide solution of 10% strength in 50 ml. of water. After exhaustive extraction with sodium hydroxide solution the alkaline extracts are combined and acidified with dilute hydrochloric acid, to yield 850 mg. of crude $\Delta^1$-3:6:20-trioxo - 17α - acetoxy-A - nor - B - homopregnene. After recrystallization from methylene chloride+ether the pure compound melts at 198 to 199° C. Optical rotation $[\alpha]_D=+76°$ (c.=0.945). In the thin-layer chromatogram (system benzene+methanol 9:1) there appears a single spot.

The share that does not react with sodium hydroxide solution amounts to 0.5 g. and is unreacted starting material.

The starting material may be prepared thus:

A solution of 10 g. of $\Delta^4$-3:20 - dioxo - 17α - acetoxypregnene in 100 ml. of methylene chloride and 300 ml. of methanol is mixed at 0° C. dropwise with 60 ml. of hydrogen peroxide of 30% strength and 20 ml. of sodium hydroxide solution of 10% strength and stirred for 27 hours at 0° C. The reaction mixture is then poured into ice water and extracted with methylene chloride and ether. After washing neutral, drying and evaporating under vacuum there are obtained 9 g. of crude 3:20-dioxo-17α-acetoxy-4:5-oxidopregnane which is used as it is, without purification, for the following step.

A solution of 5.16 g. of crude 3:20-dioxo-17α-acetoxy-4:5-oxidopregnane in 75 ml. of tertiary amyl alcohol is mixed with 2.5 ml. of glacial acetic acid and 0.5 g. of mercury, heated to the boil, and a solution of 2.5 g. of selenium dioxide in 32 ml. of tertiary amyl alcohol is vigorously stirred in dropwise. After 14 hours, the batch is cooled, filtered through a layer of Norite and the filtrate is evaporated under vacuum. The residue is taken up in ethyl acetate and successively washed with potassium iodide solution of 10% strength, sodium thiosulfate solution of 20% strength, sodium carbonate solution of 10% strength and water. On evaporation of the solvent there are obtained 5.78 g. of crude $\Delta^1$-3:20-dioxo-4:5-oxido - 17α - acetoxypregnene which, after filtration over alumina (activity II) and crystallization from methylene chloride+ether melts at 203 to 212° C.

EXAMPLE 24

1 g. of $\Delta^1$-3:6:20-trioxo-17α-acetoxy-A-nor-B-homopregnene in 100 ml. of benzene is hydrogenated in the presence of 1 g. of palladium carbon of 5% strength. When the amount of hydrogen calculated for 1 mol has been absorbed, the catalyst is filtered off and the filtrate is evaporated. The residue constitutes 3:6:20-trioxo-17α-acetoxy-A-nor-B-homopregnane which, after crystallization from ether, melts at 221–224° C. Optical rotation $[\alpha]_D = +2°$ (c.=0.164).

In the same manner as described in Example 17, $\Delta^1$-3:6-dioxo - 17α - methyl - 17β - hydroxy-A-nor-B-homoandrostene is reduced to 3:6-dioxo - 17α - methyl-17β-hydroxy-A-nor-B-homoandrostane melting at 158–160° C. Optical rotation $[\alpha]_D = +34°$ (c.=0.921).

EXAMPLE 25

4.15 g. of $\Delta^1$-3-oxo - 4:5 - oxido - 17α - methyl-17β-acetoxyandrostene in 500 ml. of dioxane are irradiated for 72 hours at 26 to 30° C. with a low-pressure burner, and the batch is then worked up as described in Example 23. The share soluble in sodium hydroxide solution amounts to 3.63 g. and constitutes $\Delta^1$-3:6-dioxo - 17α - methyl - 17β - acetoxy-A-nor-B-homoandrostene which, after recrystallization from methylene chloride+ether, melts at 206–210° C.

Catalytic reduction of the above product in a benzene solution in the presence of palladium carbon of 5% strength furnishes 3:6-dioxo -17α - methyl-17β-acetoxy-A-nor-B-homoandrostane.

The starting materials used for the irradiation can be prepared in the following manner:

$\Delta^4$-3-oxo - 17α - methyl - 17β - acetoxyandrostene is oxidized with alkaline hydrogen peroxide, as described in Example 23, to yield 3-oxo-4:5 - oxido - 17α - methyl-17β-acetoxyandrostane (melting at 119–121° C.; from acetone+hexane) and then dehydrogenated with selenium dioxide to $\Delta^1$ - 3-oxo-4:5-oxido-17α-methyl-17β-acetoxyandrostene.

EXAMPLE 26

3 g. of $\Delta^1$-3-oxo-4,5-oxido-20β-acetoxypregnene in 500 ml. dioxane are irradiated for 70 hours at a temperature of 27–30° C. with a low-pressure burner, and the batch is then worked up as described in Example 23. The share soluble in sodium hydroxide solution yields 2.16 g. of $\Delta^1$-3:6 - dioxo - 20β-acetoxy-A-nor-B-homopregnene which, after crystallization from methylene chloride+ether, melts at 161–163° C. Optical rotation in chloroform $[\alpha]_D = +134°$ (c.=0.511). In addition, 550 mg. of starting material are recovered.

The above starting material can be prepared thus:

$\Delta^4$-3-oxo - 20β - hydroxypregnene (melting at 167–170° C.) is oxidized with alkaline hydrogen peroxide as described in Example 23, the resulting product is treated with acetic anhydride+pyridine, and the 3-oxo-4:5-oxido-20β-acetoxypregnane so formed is dehydrogenated with selenium dioxide to furnish $\Delta^1$-3-oxo-4:5-oxido-20β-acetoxypregnene.

EXAMPLE 27

2 g. of $\Delta^1$-3:6-dioxo-20β-acetoxy-A-nor-B-homopregnene in 50 ml. of saturated methanolic potassium carbonate solution are boiled for 32 hours under nitrogen; the batch is then worked up as described in Example 11, to yield 1.74 g. of crude $\Delta^1$-3:6-dioxo-20β-hydroxy-A-nor-B-homopregnene which, after recrystallization from methylene chloride+ether, melts at 148–149° C. Optical rotation $[\alpha]_D = -59°$ (c.=0.937).

EXAMPLE 28

800 mg. of $\Delta^1$-3:6-dioxo-20β-hydroxy-A-nor-B-homopregnene in 200 ml. of benzene are hydrogenated in the presence of 800 mg. of palladium carbon of 5% strength. When the amount of hydrogen calculated for 1 mol has been absorbed, the catalyst is filtered off and the filtrate is evaporated under vacuum. The resulting 3:6-dioxo-20β-hydroxy-A-nor-B-homopregnane melts at 117 to 118° C. after crystallization from ether+pentane.

EXAMPLE 29

1.5 g. of the lactone of $\Delta^1$-3-oxo-4:5-oxido-17β-hydroxy-17α-(β-carboxyethyl)-androstene in 500 ml. of dioxane are irradiated for 72 hours at 26 to 29° C. with a low-pressure burner; the solution is then evaporated under vacuum and the residue is treated as described in Example 23. The extract obtained with sodium hydroxide solution is the lactone of $\Delta^1$-3:6-dioxo-17β-hydroxy-17α-(β-carboxyethyl)-A-nor-B-homoandrostene; it melts after recrystallization from methylene chloride-ether at 185–186° C., $[\alpha]_D = +85°$.

On catalytic hydrogenation as described in Example 6 the above product yields the lactone of 3:6-dioxo-17β-hydroxy-17α-(β-carboxyethyl)-A-nor - B - homoandrostane which melts after recrystallization from methylene chloride-ether at 193–194° C. The A-nor-B-homo-steroids obtained exhibit also diuretic and antialdosterone actions.

The starting material can be prepared from the lactone and $\Delta^4$-3-oxo-17β-hydroxy-17α-(β-carboxyethyl) - androstene by oxidation with hydrogen peroxide and subsequent dehydrogenation with selenium dioxide as described in Example 23.

EXAMPLE 30

Irradiation of $\Delta^1$-3:20-dioxo-4:5-oxidopregnene as described in the preceding examples gives rise to $\Delta^1$-3:6:20-trioxo-A-nor-B-homopregnene which, on catalytic reduction of the double bond in position 1:2, furnishes 3:6:20-trioxo-A-nor-B-homopregnane.

The above starting material is accessible from progesterone by epoxidation and dehydrogenation with selenium dioxide as described in Example 23.

EXAMPLE 31

When the undermentioned starting materials—obtained from the corresponding $\Delta^4$-3-ketones as described in Example 23—are irradiated, there are obtained the irradiation products shown under B below:

| A. Starting material | B. Irradiation product |
| --- | --- |
| 1-dehydro-4:5-oxidotestololactone | 1-dehydro-6-oxo-A-nor-B-homotestololactone. |
| $\Delta^1$-3-oxo-4:5-oxidocholestene | $\Delta^1$-3:6-dioxo-A-nor-B-homocholestene. |
| $\Delta^1$-3-oxo-4:5-oxidospirostene | $\Delta^1$-3:6-dioxo-A-nor-B-homospirostene. |

EXAMPLE 32

A solution of 1.5 grams of $\Delta^1$-3:20-dioxo-4:5-oxido-17α-capronyloxypregnene in 500 cc. of dioxane is irradiated and worked up as described in Example 23, the reaction product is extracted with ice-cold dilute sodium hydroxide solution and the extract acidified with hydrochloric acid, to yield $\Delta^1$-3:6:20-trioxo-17α-capronyloxy-A-nor-B-homopregnene.

In an analogous manner $\Delta^1$-3:20-dioxo-4:5-oxido-17α-methyl-pregnene can be converted into $\Delta^1$-3:6:20-trioxo-17α-methyl-A-nor-B-homo-pregnene.

The starting materials may be obtained by oxidizing $\Delta^4$-3:20-dioxo-17α-capronyloxy-pregnene and $\Delta^4$-3:20-dioxo-17α-methyl-pregnene, respectively, with hydrogen peroxide followed by dehydrogenation with selenium dioxide as described in Example 23.

EXAMPLE 33

1.5 grams of $\Delta^1$-3-oxo-4:5-oxido-7α-methyl-17β-acetoxy-androstene in 500 cc. of dioxane are irradiated as described in Example 23, $\Delta^1$-3:16-dioxo-7aα-methyl-17β-acetoxy-A-nor-B-homo-androstene being obtained.

In an analogous manner $\Delta^1$-3-oxo-4:5-oxido-7α:17α-dimethyl-17β-hydroxy-androstene is converted into $\Delta^1$-3:6-dioxo-7aα:17α-dimethyl-17β-hydroxy-A-nor-B-homo-androstene.

$\Delta^1$-3-oxo-4:5-oxido-7α-methyl-17β-acetoxy-androstene and $\Delta^1$-3-oxo-4:5-oxido-7α:17α-dimethyl-17β-hydroxy-androstene are obtained, for example, by reacting $\Delta^{1:4}$-3-oxo-7α-methyl-17β-acetoxy-androstadiene and $\Delta^{1:4}$-3-oxo-7α:17α-dimethyl-17β-hydroxy-androstadiene, respectively, with perbenzoic acid as described in Example 1.

EXAMPLE 34

In the catalytic hydrogenation according to Example 6 there are obtained from the compounds listed under A the hydrogenation products listed under B.

| A. Starting materials | B. Hydrogenation products |
| --- | --- |
| $\Delta^1$-3:6:20-trioxo-17α-capronyloxy-A-nor-B-homo-pregnene | 3:6:20-trioxo-17α-capronyloxy-A-nor-B-homo-pregnane. |
| $\Delta^1$-3:6:20-trioxo-17α-methyl-A-nor-B-homopregnene | 3:6:20-trioxo-17α-methyl-A-nor-B-homopregnane. |
| $\Delta^1$-3:6-dioxo-7aα-methyl-17β-acetoxy-A-nor-B-homo-androstene | 3:6-dioxo-7aα-methyl-17β-acetoxy-A-nor-B-homoandrostane. |
| $\Delta^1$-3:6-dioxo-7aα:17α-dimethyl-17β-hydroxy-A-nor-B-homo-androstene | 3:6-dioxo-7aα:17α-dimethyl-17β-hydroxy-A-nor-B-homoandrostane. |

EXAMPLE 35

1.5 grams of $\Delta^1$-3:20-dioxo-4:5-oxido-11β:17α-dihydroxy-21-acetoxy-pregnene are irradiated and worked up as described in Example 23, $\Delta^1$-3:6:20-trioxo-11β:17α-dihydroxy-21-acetoxy-A-nor-B-homo-pregnene being obtained and $\Delta^1$-3:6:20-trioxo-11β:17α:21-trihydroxy-A-nor-B-homo-pregnene formed by partial hydrolysis during extraction with sodium hydroxide solution.

As described in Example 6, the above irradiation products may be converted by catalytic hydrogenation into 3:6:20-trioxo-11β:17α-dihydroxy-21-acetoxy-A-nor-B-homo-pregnane and 3:6:20-trioxo-11β:17α:21-trihydroxy-A-nor-B-homo-pregnane, respectively.

The starting material used above is obtained from $\Delta^{1:4}$-3:20-dioxo-11β:17α-dihydroxy-21-acetoxy-pregnadiene by reaction with perbenzoic acid as described in Example 1.

EXAMPLE 36

1.8 grams of 17:20;20:21-bis-methylenedioxy derivative of prednisolone are allowed to stand in a solution of perbenzoic acid in 100 cc. of chloroform (45 mg./cc.) for 7 days in the dark at room temperature. The reaction solution is then diluted with ether and washed in succession with aqueous potassium iodide and sodium thiosulfate solution, water, sodium bicarbonate solution and again with water. After evaporation, 1.4 grams of a mixture containing 17:20;20:21-bis-methylenedioxy derivative of 4α:5α- and 4β:5β-oxido-prednisolone are obtained.

1.4 grams of the above mixture are irradiated in 170 cc. of dioxane for 14 hours with a low pressure mercury lamp. After working up as described in Example 23, 420 mg. of 17:20;20:21-bis-methylenedioxy derivative of $\Delta^1$-3:6:20-trioxo-11β:17α:21-trihydroxy-A-nor-B-homopregnene are obtained; after filtration over silica gel, decoloration with animal charcoal and crystallization from a mixture of acetone and petroleum ether, the product melts at 210–230° C. with decomposition; optical rotation [α]$_D$=—7° (c.=0.7). Ultraviolet spectrum: $\lambda_{max}$=236 and 310 mμ respectively, (ϵ=8000 and 6080 respectively).

EXAMPLE 37

A solution of 500 mg. of the 21-acetate of $\Delta^1$-4,5-oxido-17α,21-dihydroxy-3,11,20-trioxopregnene (melting at 214–218° C.) in 125 ml. of dioxane is irradiated for 40 hours with a mercury vapour low-pressure burner while being stirred with a magnetic stirrer under a current of nitrogen at 27–30° C. The solvent is then evaporated under vacuum and the residue taken up in a 1:2-mixture of alcohol and ether and agitated in a separating funnel three times with ice-cold 1% sodium hydroxide solution. The sodium hydroxide extract is acidified with dilute hydrochloric acid, extracted with methylene chloride and evaporated, to yield 310 mg. of crude $\Delta^1$-3,6,11,20-tetraoxo-17,21-dihydroxy-A-nor-B-homopregnene. (The 21-acetate is hydrolysed during the working up). The product is purified by chromatography on 30 times its own weight of silica gel. Elution with benzene and with benzene+ether yields about 60 mg. of oily products; elution with ether furnishes the pure compound which, after having been recrystallised from methylene chloride+ether, melts at 184–186° C.

To prepare the starting material 4.14 g. of crude 21-acetate of 4,5-oxido-3,11,20-trioxo-17α,21-dihydroxypregnane (cf. Journal of the American Chemical Society 79, page 3596 [1957]) are dissolved in 60 ml. of amylene hydrate. 2 ml. of glacial acetic acid and 0.4 g. of mercury are then added and the batch is stirred and heated to the boil, and 25 ml. of amylene hydrate containing 2 g. of selenium dioxide are dropped in. After 14 hours the batch is cooled, the amylene hydrate evaporated under vacuum, the residue taken up in ether and washed successively with sodium thiosulphate and sodium bicarbonate solution and then with water, dried and evaporated. The residue is chromatographed on alumina, and elution is performed with a 1:1-mixture of benzene and ether to yield the desired $\Delta^1$-4,5-oxido-17α,21-dihydroxy-3,11,20-trioxopregnene which melts at 214–218° C. after recrystallisation from methylene chloride+ether.

When the 21-acetate of the $\Delta^1$-4,5-oxido-6α-methyl-17,21-dihydroxy-3,11,20-trioxopregnene is irradiated in the same manner there is obtained the $\Delta^1$-7α-methyl-3,6,11,20-tetraoxo-17,21-dihydroxy-A-nor-B-homopregnene, in the enol form: $\Delta^{1,5}$-7α-methyl-6,17,21-trihydroxy-3,11,20-trioxo-A-nor-B-homo-pregnadiene.

EXAMPLE 38

A solution of 165 mg. of $\Delta^1$-3-oxo-4β,5-oxido-17β-acetoxy-1-methylandrostene in 65 ml. of dioxane is irradiated with a mercury vapour low-pressure burner (254 mμ) for 2 hours and then evaporated under vacuum. The crystalline residue is twice recrystallised from aqueous methanol, whereupon it melts at 132° C., and is $\Delta^1$-3,6-dioxo-17β-acetoxy-1-methyl-A-nor-B-homo-androstene or $\Delta^{1,5}$-3-oxo-6-hydroxy-17β-acetoxy-1-methyl-A-nor-B-homo-androstadiene respectively. For analysis a specimen is sublimed in a high vacuum at 125° C. Optical rotation [α]$_D$=+34° (c.=0.61 in chloroform). Infrared spectrum: $\nu_{max}$=1725, 1660, 1612, 1255 cm.$^{-1}$ (in chloroform). Ultraviolet spectrum: $\lambda_{max}$=249 m$\mu$. ($\epsilon$=9980), 311 m$\mu$ ($\epsilon$=6600 in ethanol).

The starting material is prepared as follows:

100 mg. of $\Delta^{1,4}$-3-oxo-17$\beta$-hydroxy-1-methylandrostadiene are acetylated for 4 hours at 50° C. in 5 ml. of a 1:1-mixture of acetic anhydride and pyridine. The batch is evaporated under vacuum and the crude product is dissolved in benzene+ether 9:1 and filtered through neutral alumina of activity III. On evaporation of the solvent there results the crude $\Delta^{1,4}$-3-oxo-17$\beta$-acetoxy-1-methylandrostadiene. After having been twice recrystallised from acetone+petroleum ether the pure compound melts at 141–142° C. Optical rotation [$\alpha$]$_D$=−10° (c.=0.53 in chloroform). Infrared spectrum in chloroform: $\nu_{max}$=1722, 1657, 1615, 1255 cm.$^{-1}$. Ultraviolet spectrum: $\lambda_{max}$=253 m$\mu$ ($\epsilon$=21500 in ethanol).

612 mg. of the above acetate in a solution of 400 mg. of perbenzoic acid in 10 ml. of chloroform is kept for 4 days in the dark at room temperature. The reaction solution is diluted with ether and successively washed with aqueous potassium iodide, sodium thiosulphate and sodium bicarbonate solution and with water. The solvent is evaporated under vacuum and the resulting crude product is chromatographed on neutral alumina of activity II. Benzene and a 9:1-mixture of benzene and ether elute 332 mg. of crystalline $\Delta^1$-3-oxo-4$\beta$,5-oxido-17$\beta$-acetoxy-1-methylandrostene which melts at 168–169° C. after two recrystallisations from acetone+petroleum ether. Optical rotation [$\alpha$]$_D$=+170° (c.=0.98 in chlorofrom). Infrared spectrum in chloroform: $\nu_{max}$=1725, 1670, 1616, 1255 cm.$^{-1}$. Ultraviolet spectrum: $\lambda_{max}$=249 m$\mu$ ($\epsilon$=9970 in ethanol).

EXAMPLE 39

350 mg. of $\Delta^1$-3-oxo-4,5-oxido-17$\beta$-acetoxy-oestrene in 70 ml. of dioxane are irradiated for 3 hours with a mercury vapour low-pressure burner, and the solution is then evaporated under vacuum. The residue is taken up in ether and the ethereal solution washed with ice-cold 2 N-sodium hydroxide solution. The basic aqueous extracts are immediately acidified with dilute sulphuric acid and then extracted with ether. The resulting organic phase is washed with water until neutral, dried and evaporated, to leave 200 mg. of crystalline photoproduct, namely $\Delta^1$-3,6-dioxo-17$\beta$-acetoxy-A-nor-B-homo-oestrene or $\Delta^{1,5}$-3-oxo-6-hydroxy-17$\beta$-acetoxy-A-nor-B-homo-oestradiene respectively. For purification the product is treated for a short time in benzene with active carbon and then dissolved in a 9:1-mixture of benzene and ether and filtered through neutral silica gel. After having been recrystallised three times from methylene chloride+methanol the product melts at 171–172° C. Optical rotation [$\alpha$]$_D$=+154° (c.=0.65 in chloroform). Infrared spectrum: $\nu_{max}$=1722, 1666, 1610, 1255 cm.$^{-1}$. Ultraviolet spectrum: $\lambda_{max}$=238 m$\mu$ ($\epsilon$=6800); $\lambda_{max}$=309 m$\mu$ ($\epsilon$=6480 in ethanol).

The starting material is prepared as follows:

A mixture of 500 mg. of 3-oxo-4,5-oxido-17$\beta$-acetoxy-oestrane, 25 ml. of a 10:1-solution of tertiary butanol and glacial acetic acid and 500 mg. of selenium dioxide is stirred for 2 hours and heated at the boil. The cooled solution is filtered and then evaporated under vacuum. The residue is dissolved in ethyl acetate and filtered through Celite. The ethyl acetate solution is then successively washed with ammonium hydrosulphide solution, ammonia, dilute sulphuric acid and with water. The oil obtained by evaporation of the solvent is taken up in benzene and treated for a short time with active carbon. The solution is freed from the active carbon and evaporated. The resulting product is dissolved in a 9:1-mixture of benzene and ether and filtered through neutral alumina of activity III, to yield 350 mg. of amorphous $\Delta^1$-3-oxo-4,5-oxido-17$\beta$-acetoxy-oestrene. Infrared spectrum in chloroform: $\nu_{max}$=1725, 1680, 1620 cm.$^{-1}$.

EXAMPLE 40

700 mg. of 3-oxo-4,5-oxido-17$\beta$-acetoxy-oestrane in 200 ml. of dioxane are irradiated for 2 hours with a mercury vapour high-pressure burner. The solution is then evaporated under vacuum and the residue chromatographed on 60 times its own weight of neutral silica gel. A 9:1-mixture of benzene and ether elutes 598 mg. of 3,6-dioxo-17$\beta$-acetoxy-A-nor-B-homo-10$\xi$-oestrane or $\Delta^5$-3-oxo-6-hydroxy-17$\beta$-acetoxy-A-nor-B-homo-10$\xi$-oestrene respectively. After two recrystallisations from methylene chloride+methanol the product melts at 152° C. Optical rotation [$\alpha$]$_D$=+62° (c.=0.85 in chloroform). Infrared spectrum in chloroform: $\nu_{max}$=1720, 1642, 1605, 1260 cm.$^{-1}$. Ultraviolet spectrum: $\lambda_{max}$=292 m$\mu$ ($\epsilon$=5900 in ethanol); $\lambda_{max}$=311 m$\mu$ ($\epsilon$=9850 in 0.01 N-potassium hydroxide solution in ethanol).

The starting material is prepared as follows:

While being stirred at 15° C. 2 ml. of aqueous 4 N-sodium hydroxide solution and then 2 ml. of perhydrol of 30% strength are added to 1 g. of 19-nortestosterone in 60 ml. The batch is kept for 4 hours at 4° C., then diluted with ethyl acetate and washed with water until neutral. The solution is evaporated under vacuum and the resulting amorphous residue is acetylated in 20 ml. of a 1:1-mixture of acetic anhydride and pyridine overnight at room temperature. The crude product obtained by evaporation under vacuum is dissolved in benzene and filtered through neutral alumina of activity II. One crystallisation of the filter residue from acetone+petroleum ether yields 750 mg. of 3-oxo-4,5-oxido-17$\beta$-acetoxy-oestrane melting at 100–102° C. A specimen recrystallised three times melts at 104° C. Optical rotation [$\alpha$]$_D$=+48° (c.=0.43 in chloroform). Infrared spectrum: $\nu_{max}$=1725=1700 (broad), 1255 cm.$^{-1}$ (in chloroform).

EXAMPLE 41

500 mg. of 3-oxo-4,5-oxido-17$\beta$-hydroxy-7a$\alpha$,17$\alpha$-dimethyl-oestrane (melting at 138–140° C. after recrystallisation from ether) in 120 ml. of dioxane are irradiated for 13 hours with a mercury vapour high-pressure burner. The solution is then evaporated under vacuum and the residue dissolved in a 4:1-mixture of benzene and ether and filtered through neutral silica gel, to yield 400 mg. of 3,6-dioxo-17$\beta$-hydroxy-7a$\alpha$,17$\alpha$-dimethyl-A-nor-B-homo-oestrane or $\Delta^5$-3-oxo-6,17$\beta$-dihydroxy-7a$\alpha$,17$\alpha$-dimethyl-A-nor-B-homo-oestrene respectively which, after one recrystallisation from aqueous methanol, melts at 168–169° C. Optical rotation [$\alpha$]$_D$=+83° (c.=0.67 in chloroform). Infrared spectrum in chloroform: $\nu_{max}$=3550, 1640, 1595 cm.$^{-1}$. Ultraviolet spectrum: $\lambda_{max}$=293 m$\mu$ ($\epsilon$=9380).

In an analogous manner the following starting materials yield the corresponding A-nor-B-homosteroids:

| Starting material | A-nor-B-homo compound |
| --- | --- |
| 3-oxo-4,5-oxido-17$\beta$-hydroxy-7a$\alpha$,17$\alpha$-dimethylandrostane (M.P. 154–156° C., from isopropyl ether). | 3,6-dioxo-17$\beta$-hydroxy-7a$\alpha$, 17$\alpha$-dimethyl-A-nor-B-homoandrostane o respectively $\Delta^5$-3-oxo-6, 17$\beta$-dihydroxy-7a$\alpha$, 17$\alpha$-dimethyl-A-nor-B-homo-androstene (M.P. 162–163° C., from isopropyl ether). |
| 3-oxo-4,5-oxido-17$\beta$-hydroxy-17$\alpha$-ethinyloestrane (amorphous). | 3,6-dioxo-17$\beta$-hydroxy-17$\alpha$-ethinyl-A-nor-B-homooestrane or respectively $\Delta^5$-3-oxo-6, 17$\beta$-dihydroxy-17$\alpha$-ethinyl-A-nor-B-homooestrene (M.P. 153–158° C., from ether). |
| 3-oxo-4,5-oxido-17$\beta$-hydroxy-17$\alpha$-ethinylandrostane (M.P. 168–174° C., from methylene chloride+ether). | 3,6-dioxo-17$\beta$-hydroxy-17$\alpha$-ethinyl-A-nor-B-homoandrostane or $\Delta^5$-3-oxo-6, 17$\beta$-dihydroxy-17$\alpha$-ethinyl-A-nor-B-homoandrostene (M.P. 166–168° C., from methylene chloride plus ether). |

| Starting material | A-nor-B-homo compound |
|---|---|
| 3-oxo-4,5-oxido-17β-acetoxy-17α-ethinylandrostane (M.P. 168–174° C.) | 3,6-dioxo-17β-acetoxy-17α-ethinyl-A-nor-B-homoandrostane and Δ⁵-3-oxo-6-hydroxy-17β-acetoxy-17α-ethinyl-A-nor-B-homoandrostene M.P. 176–182° C., from methylene chloride plus ether). |
| 3-oxo-4,5-oxido-17β-decanoyloxyoestrane (oil) | 3,6-dioxo-17β-decanoyloxy-A-nor-B-homooestrane and Δ⁵-3-oxo-6-hydroxy-17β-decanoyloxy-A-nor-B-homooestrene (M.P. 50–51° C., from pentane). |
| 3-oxo-4,5-oxido-17β-(β-phenylpropionyloxy)-oestrane (M.P. 131–134° C.) | 3,6-dioxo-17β-(β-phenylpropionyloxy)-A-nor-B-homooestrane and Δ⁵-3-oxo-6-hydroxy-17β-(x-phenylpropionyloxy)-A-nor-B-homooestrene (M.P. 98–99° C., from ether plus pentane). |
| 3-oxo-4,5-oxido-17β-hydroxy-17α-methyloestrane | 3,6-dioxo-17β-hydroxy-17α-methyl-A-nor-B-homooestrane and Δ⁵-3-oxo-6,17β-dihydroxy-17α-methyl-A-nor-B-homooestrene (M.P. 159°–161° C., from methylene chloride plus ether). |
| 3-oxo-4,5-oxido-17β-isobutyloxy-androstane | 3,6-dioxo-17β-isobutyryloxy-A-nor-B-homoandrostane and Δ⁵-3-oxo-6-hydroxy-17β-isobutyryloxy-A-nor-B-homoandrostene (M.P. 141–144° C., from ether). |
| 3-oxo-4,5-oxido-17β-n-valerianyloxy-androstane | 3,6-dioxo-17β-n-valerianyloxy-A-nor-B-homoandrostane and Δ⁵-3-oxo-6-hydroxy-17β-n-valerianyloxy-A-nor-B-homoandrostene (M.P. 90–91° C., from ether plus pentane). |
| 3-oxo-4,5-oxido-17β-undecenoyloxy-androstane | 3,6-dioxo-17β-undecenoyloxy-A-nor-B-homoandrostane and Δ⁵-3-oxo-6-hydroxy-17β-undecenoyloxy-A-nor-B-homoandrostene (M.P. 51–52° C., from pentane). |
| 3-oxo-4,5-oxido-7aα,17α-dimethylandrostane (M.P. 151–153° C.) | Δ⁵-3-oxo-6,17β-dihydroxy-7aα,17α-dimethyl-A-nor-B-homoandrostene (M.P. 162–164° C.). |
| 3-oxo-4,5-oxido-20-ethylenedioxypregnane (M.P. 217–223° C.) | Δ⁵-3-oxo-6-hydroxy-20-ethylenedioxy-A-nor-B-homopregnene (M.P. 160–161° C.); Δ⁵-3,20-dioxo-6-hydroxy-A-nor-B-homopregnene (M.P. 137–138° C.); Δ⁵-3,20-dioxo-6-acetoxy-A-nor-B-homopregnene (M.P. 95–97° C.). |

The above starting materials are prepared from the corresponding Δ⁴-3-ketones by the method described in Example 40.

EXAMPLE 42

A mixture of 1.2 g. of Δ⁵-3-oxo-6,17β-dihydroxy-17α-methylandrostene, 1 ml. of hydazine hydrate and 100 ml. of ethanol is refluxed for 4 hours. The cooled reaction mixture is evaporated to dryness under vacuum. The pyrazone derivative thus formed is recrystallized once from aqueous methanol, to yield 620 mg. of crystals melting at 210 to 212° C. Optical rotation $[\alpha] = +20°$ (c.=0.50, in chloroform). Ultraviolet spectrum $$\Lambda_{max} = 226 \text{ m}\mu$$

$\epsilon = 3400$, in ethanol). Infrared spectrum in Nujol:
$\nu_{max} = 3170$ broad), 1628 weak.

EXAMPLE 43

3.45 g. of 3-oxo-4,5-oxido-20-ethylenedioxy-21-acetoxypregnane in 255 ml. of dioxane are irradiated for 13 hours with a high-pressure burner at a temperature of 17 to 18° C. The solution is then evaporated, to leave as residue crude 3,6-dioxo-20-ethylenedioxy-21-acetoxy-A-nor-B-homopregnane; to purify it, it is dissolved in methylene chloride and chromatographed on silica gel (containing 5% of moisture). The residue of the methylene chloride eluates is recrystallized from methanol to yield the pure product melting at 126–131° C. The mother liquor is evaporated, and the residue is dissolved in 60 ml. of methanol, mixed with a solution of 1 g. of potassium carbonate in 20 ml. of water and hydrolyzed by being boiled for 2 hours under reflux. The solution is evaporated under vacuum and the residue agitated with ethyl acetate. The ethyl acetate solutions are combined, washed with water, dried and evaporated under vacuum. To purify the hydrolysis product the residue is taken up in a 1:3-mixture of methylene chloride and ether and repeatedly agitated with ice-cold 2 N sodium hydroxide solution. The combined sodium hydroxide extracts are adjusted at 0° C. with phosphoric acid to pH=4 to 5 and exhaustively extracted with methylene chloride. The methylene chloride solutions are washed with water, dried and evaporated under vacuum. After repeated recrystallization from a mixture of methylene chloride and isopropyl ether there are obtained 1.56 g. of pure 3,6-dioxo-20-ethylene-dioxy-21-hydroxy-A-nor-B-homo-pregnane melting at 164–165° C.

1 g. of the latter compound is shaken with 20 ml. of oxygen-free 70% formic acid (deaerted at 100° C. with nitrogen) for 20 minutes under nitrogen at 60° C. The resulting solution is mixed at 0° C. with a solution of 34 g. of potassium bicarbonate in 200 ml. of water and exhaustively extracted by agitation with methylene chloride. The combined methylene chloride solutions are washed with water, dried and chromatographed on 20 g. of silica gel (containing 5% of moisture). The considerably concentrated methylene chloride eluates are mixed with isopropyl ether, whereupon 3,6,20-trioxo-21-hydroxy-A-nor-B-homopregnane crystallizes out; it melts at 132–136° C. Yield: 710 mg.

The starting material used above is obtained from the known Δ⁵-3,20-bisethylenedioxy-21-acetoxypregnene by partial deketalization in 3-position with a mixture of paratoluenesulfonic acid and acetic acid in acetone. The resulting monoketal is mixed with hydrogen peroxide in the presence of alkali and the hydrolized 21-acetoxy group is finally reacetylated with acetic anhydride in the presence of pyridine.

Irradiation as described above may also be performed with 3-oxo-4,5-oxido-20-ethylenedioxy-21-hydroxypregnane, whereupon 3,6-dioxo-20-ethylenedioxy-21-hydroxy-A-nor-B- homopregnane is obtained as irradiation product.

EXAMPLE 44

5 g. of 3-oxo-4,5-oxido-20-ethylenedioxypregnane in 900 ml. of dioxane are irradiated for 48 hours with a high-pressure burner at 17 to 18° C. The solution is evaporated and the residue dissolved in a 1:3-mixture of methylene chloride and ether, and the solution is repeatedly agitated with ice-cold 8% sodium hydroxide solution. The combined sodium hydroxide extracts are mixed at 0° C. with phosphoric acid to pH=4 to 5 and the whole is exhaustively extracted with methylene chloride. The methylene chloride extracts are washed with water, dried and evaporated under vacuum. On addition of ethanol and further evaporation of the methylene chloride, 3,6-dioxo-20-ethylenedioxy-A-nor-B-homopregnane crystallizes out. Recrystallization from a mixture of methylene chloride and isopropyl ether furnishes 2.2 g. of the pure compound melting at 160 to 162° C.

2 g. of the compound thus obtained are mixed with 30 ml. of 80% acetic acid and heated for 30 minutes on a boiling water bath. The solution is then evaporated under vacuum, the residue is dissolved in a 1:3-mixture of methylene chloride and ether, and the solution is washed with water, dried and evaporated under vacuum. The residue is dissolved in methylene chloride and chromatographed on 20 g. of silica gel (containing 5% of moisture). The methylene chloride solutions are evaporated and the residue is recrystallized from a mixture of methylene chloride and isopropyl ether, to yield 1.6 g. of 3,6,20-trioxo-A-nor-B-homopregnane melting at 137–138° C.

1 g. of the last-mentioned compound is dissolved in 2 ml. of pyridine, 2 ml. of acetic anhydride are added and the whole is kept for 4 days at room temprature. The solution is then mixed with ice, kept for 1 hour at 20° C. and evaporated under vacuum. The residue is chromatographed first with methylene chloride and then with a 99:1-mixture of methylene chloride and tertiary butanol on 20 g. of silica gel; the first methylene chloride fractions may still contain some starting material. The further fractions eluted with methylene chloride and a 99:1-mixture of methylene chloride and tertiary butanol are combined and evaporated. The residue is recrystallized from hexane+pentane, to yield 800 mg. of $\Delta^5$-3,20-dioxo-6-acetoxy-A-nor-B-homopregnene melting at 95 to 97° C.

The above-mentioned starting material is accessible from the known $\Delta^5$-3$\beta$-acetoxy-20-ethylenedioxypregnene by alkaline hydrolysis, oxidation of the resulting $\Delta^5$-3-hydroxy-compound with chromium trioxide to $\Delta^4$-3-oxo-20-ethylenedioxypregnene, followed by treatment with hydrogen peroxide in the presence of sodium hydroxide solution.

EXAMPLE 45

700 mg. of 3-oxo-4,5-oxido-16$\alpha$,17$\alpha$-dihydroxy-20-ethylenedioxypregnane in 140 ml. of dioxane are irradiated for 13 hours with a high-pressure burner at 20° C. The solution is evaporated and the residue dissolved in ether and repeatedly agitated with ice-cold 2% sodium hydroxide solution. The aqueous extracts are combined, adjusted at 0° C. with phosphoric acid to pH=4 to 5 and exhaustively extracted by agitation with methylene chloride. The methylene chloride solutions are combined, washed with water, dried and evaporated under vacuum. The resulting 3,6-dioxo-16$\alpha$,17$\alpha$-dihydroxy-20-ethylenedioxy-A-nor-B-homopregnane (360 mg.) is dissolved in 30 ml. of pure acetone, heated to a gentle boil, mixed with 3 drops of concentrated hydrochloric acid, heated for another 2 minutes and then kept for 24 hours at 20° C. On dilution with ice water there are obtained crystals which are suctioned off and dried. For purification they are dissolved in methylene chloride and chromatographed on 2 g. of silica gel (containing 5% of moisture). The residue from the methylene chloride eluates is recrystallized from methylene chloride+isopropyl ether, to yield 280 mg. of 3,6,20-trioxo-16$\alpha$,17$\alpha$-dihydroxy-A-nor-B-homopregnane-16,17-acetonide melting at 204 to 205° C.

The starting material used above is obtained from $\Delta^{5,16}$-3$\beta$-acetoxy-20-ethylenedioxypregnadiene by alkaline hydrolysis and Oppenauer oxidation to $\Delta^{4,16}$-3-oxo-20-ethylenedioxypregnadiene, oxidation with hydrogen peroxide to the corresponding 4,5-oxido compound, followed by hydroxylation of the 16,17-double bond with osmium tetroxide.

EXAMPLE 46

A solution of 2.168 g. of 3-oxo-4,5-oxido-11$\beta$-hydroxy-17$\alpha$,20;20,21-bismethylenedioxypregnane (mixture of the 4$\alpha$,5$\alpha$- and 4$\beta$,5$\beta$-oxido compounds) in 500 ml. of pure dioxane is vigorously stirred at 18 to 22° C. while being irradiated with a mercury vapour high-pressure lamp until a specimen of the reaction mixture reveals that the infrared absorption has reached a maximum at 6.08 and 6.24$\mu$. This is generally the case after 8 to 16 hours. The solution is then evaporated under vacuum, the pale yellowish residue is dissolved in 320 ml. of benzene and the crude product is absorbed on 80 g. of silica gel while being flushed with 80 ml. of benzene. Successive elution is performed with 4 portions each of benzene, benzene+ethyl acetate (95:5) and benzene+ethyl acetate (85:15), 400 cc. of solvent being used for every fraction. The resulting photoisomerization product is found in the last benzene +ethyl acetate (95:5) fractions and in the first benzene +ethyl acetate (85:15) fractions. The crystalline evaporation residues yield after recrystallization from methylene chloride+ether a total of 0.967 g. of 3,6-dioxo-11$\beta$-hydroxy - 17,20;20,21 - bismethylenedioxy - A - nor - B-homopregnane in colorless, coarse rhombohedrons melting at 193–196° C.

To eliminate the protective groups in the side chain, a solution of 0.420 g. of 3,6-dioxo-11$\beta$-hydroxy-17$\alpha$,20;20,21-bismethylenedioxy-A-nor-B-homopregnane in 25 ml. of tetrahydrofuran is mixed at 15° C. within 30 minutes with 75 ml. of 2.66-molar aqueous perchloride acid. The solution is stirred for 16 hours at 20° C., then cooled with ice and neutralized with 250 ml. of N-sodium bicarbonate solution and the hydrolysis product is agitated with methylene chloride+ether (1:2). The extracts are washed with 0.4 N-sodium bicarbonate solution and with water, dried over sodium sulfate and evaporated to yield 0.372 g. of a crystalline crude product; for purification it is dissolved in 100 ml. of benzene and the solution is filtered through a column of 10 g. of silica gel prepared with benzene, while being further eluated with benzene+ethyl acetate mixtures 95:5, 85:15 and 50:50. On evaporation under vacuum the filtrates are extensively freed from benzene and ethyl acetate and yield a total of 0.315 g. of pure 3,6,20 - trioxo - 11$\beta$,17$\alpha$-21 - trihydroxy - A - nor - B-homopregnane in almost colorless crystals melting at 137–138°/176–178° C.

When the 17,20;20,21-bismethylenedioxy group is split with 70% perchloric acid in glacial acetic acid at room temperature (2–3 hours), $\Delta^5$ - 3,20 - dioxo-6-acetoxy-11$\beta$, 17$\alpha$,21-trihydroxy-A-nor-B-homopregnane is obtained, in addition to the corresponding 21-acetate, which can be hydrolyzed as described above with dilute perchloric acid in tetrahydrofuran to 3,6,20-trioxo-11$\beta$,17$\alpha$,21-trihydroxy-A-nor-B-homopregnane and to its 21-acetate respectively.

The starting material used in the above example can be prepared as follows:

In the course of 30 minutes, at —15° to —20° C., 62.5 ml. of N-aqueous tetramethylammonium hydroxide and 31.25 ml. of 30% hydrogen peroxide are added simultaneously with stirring from two separate dropping funnels to a solution of 2.528 g. of $\Delta^4$-3-oxo-11$\beta$-hydroxy-17$\alpha$,20;20,21-bismethylenedioxy-pregnene in 532 ml. of methanol previously cooled to —15° C. After having kept the solution for 24 hours at —10° C., the alkali is neutralized at —15° C. with 62.5 ml. of 1.5 N-orthophosphoric acid; the reaction solution is poured over a mixture of 250 g. of ice and 500 ml. of ice-cold water and extracted by agitation with ice-cold methylene chloride. The ice-cold extracts are washed with water, combined, dried over sodium sulfate and evaporated under vacuum, towards the end with addition of ether. The ether solution is freed from methylene chloride and yields 2.035 g. of crystalline pure 3-oxo-4,5-oxido-11$\beta$-hydroxy-17$\alpha$,20;20, 21-bismethylenedioxypregnane (a mixture of the 4$\alpha$,5$\alpha$- and 4$\beta$,5$\beta$-oxido compounds) melting at 202–286° C.

The starting materials listed below, obtained by known processes, yield in an analogous manner the corresponding A-nor-B-homosteroids:

| Starting materials | A-nor-B-homo compounds |
|---|---|
| 3-oxo-4,5-oxido-17α,20:20,21-bismethylenedioxy-$\Delta^{9(11)}$-pregnene | 3,6-dioxo-17α,20;20,21-bismethylenedioxy-A-nor-B-homo-$\Delta^{9(11)}$-pregnene (M.P. 224–226° C.).<br>3,20-dioxo-6,21-diacetoxy-1 17α-hydroxy-$\Delta^{5,9(11)}$-A-nor-B-homo-pregnadiene (M.P. 188–192° C.).<br>3,6,20-trioxo-17α-hydroxy-21-acetoxy-A-nor-B-homo-$\Delta^{9(11)}$-pregnene. |
| 3,11-dioxo-4,5-oxido-17,20;20,21-bismethylenedioxy-$\Delta^1$-pregnene (M.P. 265–273° C.) | 3,6,11-trioxo-17,20;20,21-bismethylenedioxy-A-nor-B-homo-$\Delta^1$-pregnene (M.P. 217–220° C.).<br>3,6,11,20-tetraoxo-17α,21-dihydroxy-A-nor-B-homo-$\Delta^1$-pregnene-(M.P. 188–191° C.) and its 21-acetate.<br>3,11,20-trioxo-6,21-diacetoxy-17α-hydroxy-A-nor-B-homo-$\Delta^{1,5}$-pregnadiene. |

EXAMPLE 47

1000 tablets each containing 5 mg. of the active substance. Ingredients:

|  | G. |
|---|---|
| 3,6,20-trioxo-17β-acetoxy-A-nor - B - homo - pregnane | 5.0 |
| Lactose | 70.0 |
| Gelatine | 3.0 |
| Wheat starch | 40.0 |
| Arrowroot | 15.0 |
| Magnesium stearate | 0.7 |
| Talc | 6.3 |
|  | 140.0 |

*Procedure.*—The mixture of the active ingredient, lactose and wheat starch is moistened with a gelatine solution of 10% strength to form a slightly plastic mass, and then granulated in the usual manner. After being dried at 40° C., the mass is brought into the usual grain size by being passed through a sieve. Arrowroot, magnesium stearate and talc are added to the dried mass and the mixture is then compressed into tablets of 7 mm. in diameter.

EXAMPLE 48

1000 tablets each containing 1 mg. of the active substance. Ingredients:

|  | G. |
|---|---|
| $\Delta^1$-3:6:20-trioxo-17β-acetoxy-A-nor-B-homo - pregnene | 1.0 |
| Lactose | 53.0 |
| Gelatine | 1.0 |
| Wheat starch | 39.5 |
| Magnesium stearate | 0.3 |
| Talc | 5.2 |
|  | 100.0 |

Procedure: analogous to that described in Example 47.

EXAMPLE 49

1000 tablets each containing 1 mg. of the active substance. Ingredients:

|  | G. |
|---|---|
| $\Delta^1$-3:6-dioxo-17α-methyl-17β-hydroxy-A - nor - B-homo-androstene | 1.0 |
| Lactose | 50.0 |
| Colloidal silicic acid with hydrolysed starch | 5.0 |
| Wheat starch | 20.0 |
| Arrowroot | 9.0 |
| Magnesium stearate | 0.7 |
| Talc | 4.3 |
|  | 90.0 |

*Procedure.*—Analogous to that described in Example 47.

EXAMPLE 50

In the manner described in Examples 47 to 49 tablets can be prepared each containing 25 mg. of the lactone of $\Delta^1$-3:6-dioxo-17β-hydroxy - 17α-(β-carboxy-ethyl)-A-nor-B-homo-androstene or 1 to 5 mg. of the active products described in the following examples.

EXAMPLE 51

1000 linguettes each containing 1 mg. of the active substance. Ingredients:

|  | G. |
|---|---|
| $\Delta^1$-3:6:20-trioxo-11β:17α:21-trihydroxy - A - nor-B-homo-pregnene | 1 |
| Lactose | 100 |
| Saccharose | 229 |
| Stearic acid | 3 |
| Talc | 17 |
|  | 350 |

*Procedure.*—The mixture of the active substance with lactose is moistened with an aqueous solution of saccharose and granulated in the usual manner. After being dried, the sieved granulate is mixed with stearic acid and talc and then compressed into linguettes.

EXAMPLE 52

100 oil ampoules each containing 25 mg./ml. of the active substance. Ingredients:

3:6-dioxo-17β-acetoxy-A-nor-B-homo-androstane—2.5 g.
Benzyl alcohol—10 ml.
Sesame oil—90 ml.

*Procedure.*—The active ingredient is dissolved in benzyl alcohol and the stirred solution diluted with hot sterilized sesame oil. 1 ml. of this solution containing the ingredients in the above given amounts is filled in ampoules which are sterilized at 160° C. for 1.5 hours.

EXAMPLE 53

100 oil ampoules each containing 10 mg./ml. of the active substance. Ingredients:

$\Delta^1$ 3:6 - dioxo - 17β-acetoxy-A-nor-B-homo-androstene—1.0 g.
Neutral sterilized sesame oil—100 ml.

*Procedure.*—In a 100 ml. flask the active substance is dissolved in 5 to 10 ml. of pure acetone and the acetone evaporated. The residue is then dissolved in the sesame oil which has been purified and sterilized by heating it to 180° C. for two hours. The solution obtained is filtered through a glass filter and 1 ml. of the filtrate is filled in ampoules which are sterilized at 160° C. for 1.5 hours.

EXAMPLE 54

In the manner described in Examples 52 and 53 oil ampoules can be prepared each containing 10 to 25 mg. of $\Delta^{1,5}$-3-oxo-6:17β-diacetoxy-A-nor-B-homo-androstadiene,
$\Delta^1$-3:6-dioxo-17β-acetoxy-19-nor-A-nor-B-homo-androstene,
$\Delta^1$-3:6:20-trioxo-17α-capronyloxy-A-nor-B-homo-pregnene or
3:6-dioxo-7aα-methyl-17β-acetoxy-A-nor-B-homo-androstane.

EXAMPLE 55

1000 tablets of an anabolic preparation containing 3,6 - dioxo - 17β - hydroxy - 7aα,17α - dimethyl-A-nor-B- homo-oestrane are manufactured from the following ingredients:

| | Grams |
|---|---|
| 3,6 - dioxo - 17β-hydroxy-7aα,17α-dimethyl-A-nor-B-homo-oestrane | 1.0 |
| Lactose | 74.0 |
| Gelatine | 3.0 |
| Wheat starch | 40.0 |
| Arrowroot | 15.0 |
| Magnesium stearate | 0.7 |
| Talcum | 6.3 |
| | 140.0 |

*Formulation.*—The active principle is mixed with lactose and wheat starch and moistened with a 10% gelatine solution to form a slightly plastic dough which is then granulated in the known manner, dried at 40° C. and reduced to the conventional particle size by being sifted. The dry granulate is mixed with arrowroot, magnesium stearate and talcum, and the whole is mixed and pressed to form tablets of 7 mm. diameter.

Another especially suitable oral anabolic medicament form is the following:

1000 tablets containing 3,6-dioxo-17β-hydroxy-7aα,17α-dimethyl-A-nor-B-homo-oestrane.

| | Grams |
|---|---|
| 3,6 - dioxo - 17β - hydroxy-7aα,17α-dimethyl-A-nor-B-homo-oestrane | 0.1 |
| Lactose | 50.0 |
| Colloidal silicic acid with hydrolysed starch | 5.0 |
| Arrowroot | 9.0 |
| Wheat starch | 20.9 |
| Magnesium stearate | 0.7 |
| Talc | 4.3 |
| | 90.0 |

The tablets are made in a manner similar to that set forth above.

For parenteral use there are especially suitable oil ampoules as follows:

100 oil ampoules each containing 0.05 mg./ml. of the active substance.

Ingredients:
3,6 - dioxo - 17β - hydroxy - 17aα,17α - dimethyl-A-nor-B-homo-oestrane—0.005 gram
Neutral sesame oil—100 ml.

They are prepared in a manner similar to that set forth in previous examples.

In an analogous manner anabolic preparations containing 3,6 - dioxo - 17β-hydroxy-7aα-17α-dimethyl-A-nor-B-homo-androstene can be manufactured.

EXAMPLE 56

100 oil ampoules of an anabolic preparation for parenteral administration, each containing 25 mg. per ml. of Δ¹-3,6-dioxo-17β-acetoxy-1-methyl-A-nor-B-homo-androstene are manufactured from the following ingredients:

Δ¹ - 3,6 - dioxo - 17β - acetoxy - 1 - methyl-A-nor-B-homo-androstene—2.5 g.
Benzyl alcohol—10 ml.
Sesame oil—90 ml.

The active principle is dissolved in the benzyl alcohol and the stirred solution is diluted with sesame oil sterilised at an elevated temperature. 1 ml. of this solution, which contains the above proportions of the ingredients, is charged into ampoules which are then sterilised for 1½ hours at 160° C.

In an analogous manner anabolic preparations can be prepared which are suitable for parenteral administration and contain as active principle Δ¹-3,6-dioxo-17β-acetoxy-A-nor-B-homo-oestrene or 3,6-dioxo-17β-acetoxy-A-nor-B-homo-10ξ-oestrane.

EXAMPLE 57

1000 tablets of a gestagenic pharmaceutical preparation each containing 5 mg. of 3,6-dioxo-17β-hydroxy-17α-ethinyl-A-nor-B-homo-oestrane are manufactured from the following ingredients:

| | Grams |
|---|---|
| 3,6 - dioxo-17β-hydroxy-17α-ethinyl-A-nor-B-homo-oestrane | 5.0 |
| Lactose | 70.0 |
| Gelatine | 3.0 |
| Wheat starch | 40.0 |
| Arrowroot | 15.0 |
| Magnesium stearate | 0.7 |
| Talcum | 6.3 |
| | 140.0 |

*Formulation.*—As described in Example 55.

In an analogous manner gestagenic preparations for oral administration, containing 3,6-dioxo-17β-hydroxy-17α-ethinyl-A-nor-B-homo-androstane as active principle, can be manufactured.

EXAMPLE 58

1000 tablets of a pharmaceutical preparation for use as an antiphlogistic, each containing 1 mg. of Δ¹-3,6,11,20-tetraoxo - 17α,21-dihydroxy-A-nor-B-homo-pregnene, are manufactured from the following ingredients:

| | Grams |
|---|---|
| Δ¹-3,6,11,20-tetraoxo-17α,21 - dihydroxy-A-nor B-homopregnene | 1.0 |
| Lactose | 53.0 |
| Gelatine | 1.0 |
| Wheat starch | 39.5 |
| Magnesium stearate | 0.3 |
| Talcum | 5.2 |
| | 100.0 |

*Formulation.*—As described in Example 55.

EXAMPLE 59

1000 tablets of an anabolic preparation each containing 5 mg. of 3,6-dioxo-17β-hydroxy-17α-methyl-A-nor-B-homo-androstane are manufactured from the following ingredients:

| | Grams |
|---|---|
| 3,6-dioxo-17β-hydroxy - 17α - methyl - A-nor-B-homo-androstane | 5.0 |
| Lactose | 70.0 |
| Gelatine | 3.0 |
| Wheat starch | 40.0 |
| Arrowroot | 15.0 |
| Magnesium stearate | 0.7 |
| Talcum | 6.3 |
| | 140.0 |

The manufacture is similar to that described in Example 57.

What is claimed is:
1. Process for the manufacture of A-nor-B-homo-steroids which comprises irradiating a member selected from the group consisting of a 3-oxo-4α,5α-oxido-steroid, a 3-oxo-4β,5β-oxido-steroid and the 1-dehydro derivative thereof with ultraviolet light.
2. Process according to claim 1, wherein irradiation is performed in an organic solvent.
3. Process according to claim 1, wherein irradiation is performed in dioxane.

References Cited

UNITED STATES PATENTS 3,013,027  12/1961  Ruzicka et al. _____ 204—158

HOWARD S. WILLIAMS, Primary Examiner

U.S. Cl. X.R.

260—340.9, 343.6